UNITED STATES PATENT OFFICE.

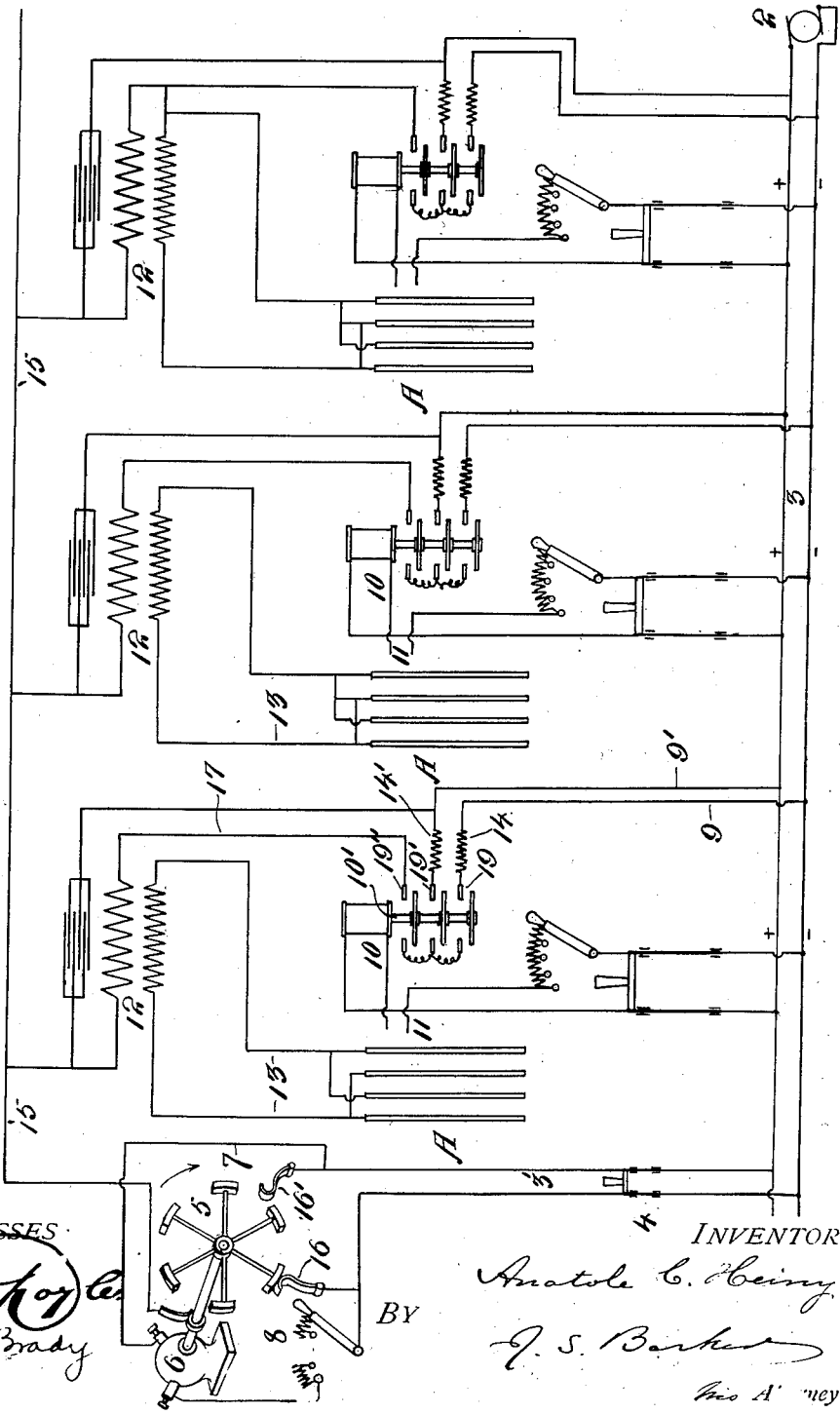

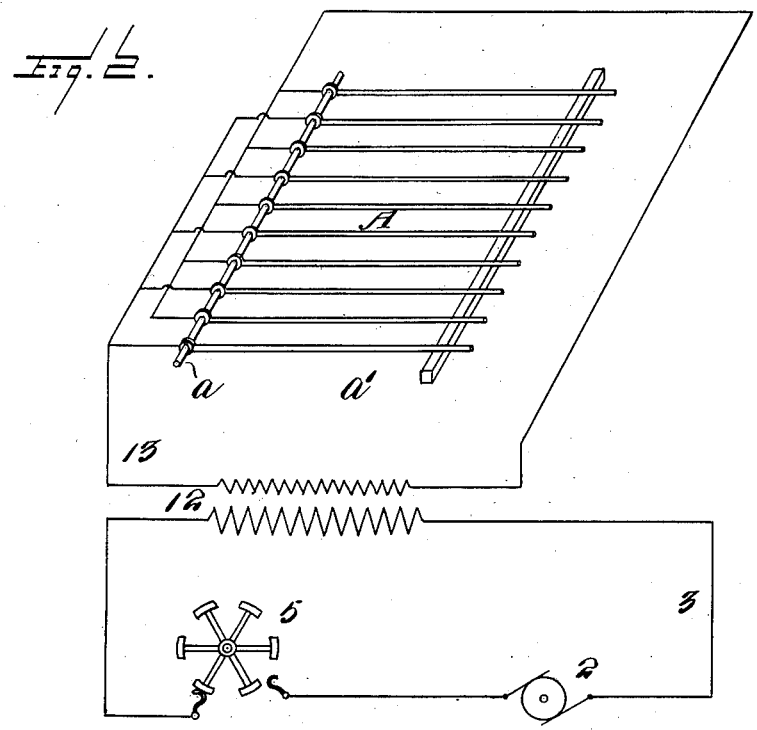
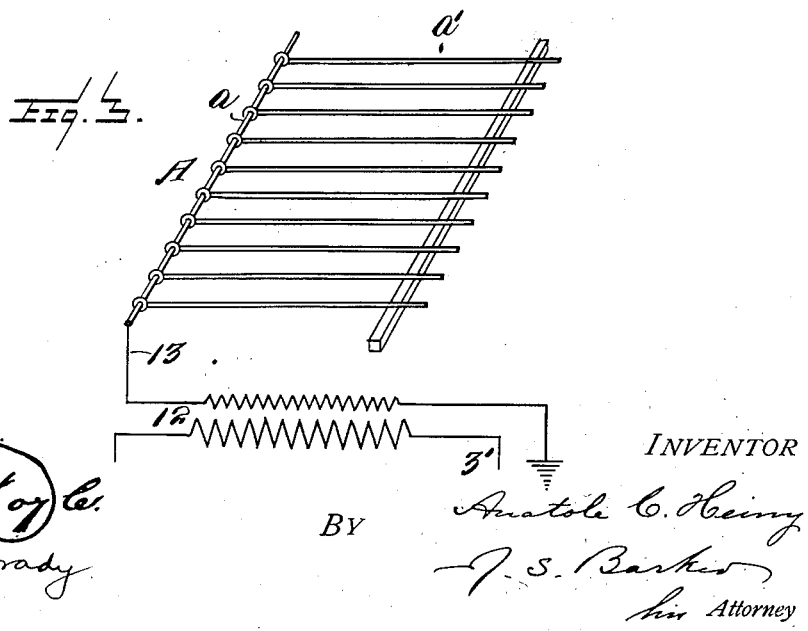

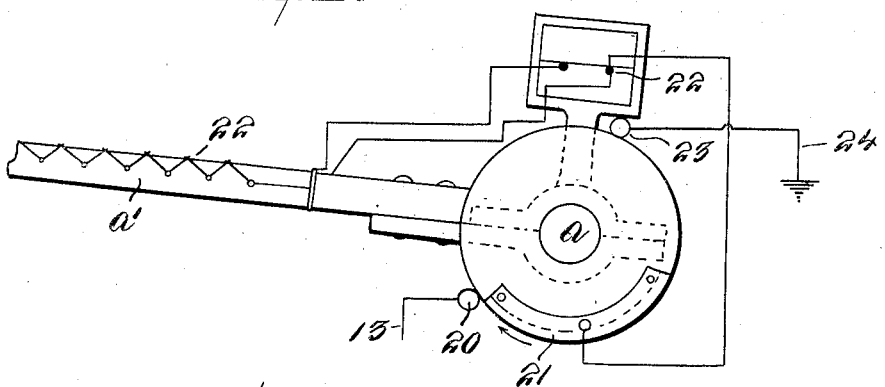
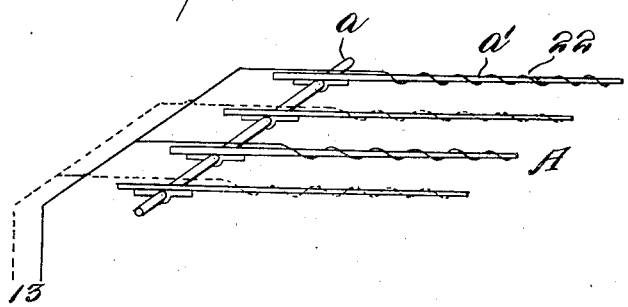
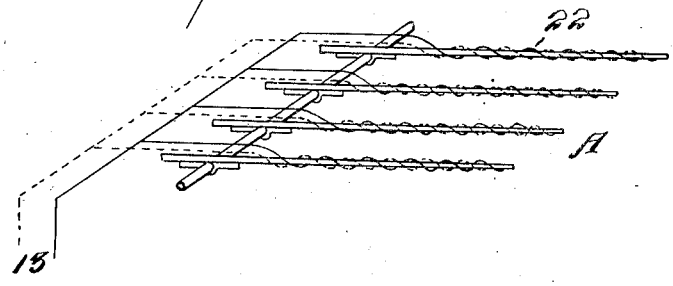

ANATOLE C. HEINY, OF NEW YORK, N. Y.

METHOD OF AND APPARATUS FOR REMOVING OR DISSIPATING STATIC ELECTRICITY FROM PAPER, CLOTH, YARN, &c.

1,099,799.   Specification of Letters Patent.   Patented June 9, 1914.

Application filed April 14, 1909, Serial No. 489,951. Renewed September 17, 1913. Serial No. 790,351.

*To all whom it may concern:*

Be it known that I, ANATOLE C. HEINY, a citizen of the United States, residing at New York city, in the county and State of New York, have invented new and useful Improvements in Methods of and Apparatus for Removing or Dissipating Static Electricity from Paper, Cloth, Yarn, &c., of which the following is a specification.

My invention relates to a method of and apparatus for removing the static electricity from paper, cloth, yarn, or other substances, with which during their manufacture or subsequent manipulation they at times become charged. Many methods have been proposed and some adopted for effecting the removal of this electricity, and these have been attended with more or less success. I have demonstrated that by means of the apparatus, and by following the method, herein described, an electrically charged dielectric substance, such as a sheet of paper, may be quickly, easily, and permanently, diselectrified, or have its charge of electricity removed or dissipated.

It is well known that whenever a current of electricity flows along a conductor forming a closed circuit there is produced around it a magnetic field; but, when the conductor or conductors are connected with the terminals of the secondary of an induction coil, through whose primary alternations of high frequency are passing, there is produced around them an alternating electro-static field, the intensity of which is dependent on the strength of the primary current and to a certain degree on the frequency of alternations of said current.

I have discovered that, if a dielectric charged with electricity, be brought into an alternating electro-static field, such as just described, and that, previous to its removal therefrom, the field be gradually suppressed, the dielectric loses, during this period, much or nearly all of its electric charge; and that the removal or dissipation of the electricity is more nearly complete than is the case when the electrified body is removed from such a field while its full strength is maintained. I have also discovered that if, in addition to coming into an electro-static field, the intensity or strength of which is gradually brought from its highest tension to or very near the null point, as above said, the electrically charged dielectric comes into direct contact with the conductors or terminals of the above mentioned secondary, then its charge of electricity is even more reduced than when there is not such direct contact, because it will be removed by a conductive discharge similar to that which takes place when a Leyden jar or condenser is discharged. And I have further discovered that the best results in the discharging of paper, yarns, &c., are obtained by changing the ordinary alternating electro-static field for an interrupted alternating electro-static field, *i. e.*, an alternating electrostatic field the alternating periods of which are separated by periods of no intensity or no field at all.

The principles of operation just stated are carried out in the process and by means of the apparatus forming the subject of this case.

In the accompanying drawings—Figure 1 is a diagram illustrating the principle and method of operation of the invention as applied to the flies of a set of printing presses for the purpose of removing static electricity from the sheets of paper delivered to the said flies. Figs. 2 and 3 are diagrams illustrating systems somewhat different from that shown in Fig. 1 but embodying the invention. Fig. 4 is a sectional view taken on the line IV—IV of Fig. 2. Figs. 5 and 6 illustrate two different methods of applying the conductors to the fly sticks.

In the drawings A represents the delivery fly of a printing press comprising a rock shaft $a$ and sticks or fingers $a'$, the latter being formed of material that may serve as a series of parallel electric conductors, or of non-conducting material to which are secured bare conductors as indicated in Figs. 4, 5 and 6, that represented in Fig. 5 being the preferred arrangement.

The fly stick conductors, either the fly sticks themselves or conductors carried thereby, are connected with a conductor adapted to be charged with a current of very high voltage but low amperage, and the connections may be either such as illustrated in Fig. 3 where all of the sticks are connected with the same lead of the conductor so that whenever a current passes along them it always travels in the same direction in all the fingers, or as illustrated in the other views where the alternate fly sticks are connected with the opposite leads of the circuit so that the electric current in adjacent fly sticks travels in opposite directions. Either of these arrangements is found to work satisfactorily, though I prefer that last described.

While the circuit into which the fly conductors are connected may be connected with any suitable generator or source of electricity, yet for practical purposes it is desirable that the generator should be of such nature as to charge the conductors with electricity of very high tension or voltage but of low amperage, and such apparatus is diagrammatically represented in the drawings.

Referring particularly to Figs. 1 and 2, 2 indicates a source of electricity such as a direct current generator from which lead the mains 3 of the supply circuit. A branch 3' from the main line leads to and includes the apparatus embodying the present invention, a switch 4 being arranged so that the branch may be connected into the main circuit at will. When employing a direct current of electricity, as in the system illustrated herein, it becomes necessary to interrupt it before it is transformed into a high tension harmless current to be directly employed for removing the static electricity from the sheets of paper or other articles being treated. 5 designates an interrupter suitably driven and arranged to break or interrupt the flow of current in the branch 3' from eight thousand to fifteen thousand times per minute and at each break or interruption to change or reverse the direction of the flow of the current in that part of the branch situated beyond the said interrupter. This interrupter is driven in any suitable manner as by a small electric motor 6 situated in a branch line 7 in which is located a rheostat 8 arranged to control the speed of the motor and, accordingly, the frequency of the interruptions as may be desired. A step-up transformer 12 is located between the branch circuit 3' and a circuit 13 in which are included the fly conductors already described, the primary coil being in the branch 3' and the secondary in the circuit 13. The circuit 3' is normally open and is controlled by an automatically operated magnetic switch 10 located in the branch circuit, 11, including the motor that drives the press of which the fly A is a part. This arrangement is adopted in order that the apparatus described shall be put into operation only when the press is being driven, it at other times being in open circuit and hence inactive. The movable armature 10' of the magnetic switch carries a series of contacts adapted to make contact with and unite a set of stationary contacts 19, 19', 19" when the magnet is energized. One of these stationary contacts, 19", is the terminal of the wire 17 leading from the primary coil of the transformer 12 and the others are terminals of branch wires 9, 9' leading respectively from the two mains or leads of the supply circuit 3. Resistances, designated 14, 14', greater than the resistance of the primary coil of the transformer, are interposed respectively between the branch line wires 9, 9' and their terminal contacts 19, 19'.

The magnetic switch 10 is but one form of apparatus by means of which the mechanism herein described, and embodying my invention, is put into operation only when the press itself is being driven and I do not wish to be limited to the particular means illustrated and described, as the interrupter could be connected with some driven part of the press, from which it receives its motion, in which event the magnetic switch 10 and the electric motor for driving the interrupter would be dispensed with, and this arrangement in some conditions is to be desired.

In Fig. 1 I have shown an installation for three presses, illustrating how but a single interrupter is necessary although the other parts thus far described are duplicated for each press. From the interrupter a conductor 15, which becomes a part of the branch circuit 3', leads to the primary coil of the transformer at each press. But in practice, whenever the cost of installation is not an object of the first importance, I prefer to use a separate interrupter for each press, driving it either by its own independent electric motor or by connection with some driven part of the press with which it is associated.

Referring to Fig. 1, when the parts are in the position there represented, the circuit may be traced as follows: Starting from the generator 2, the circuit is thence by the positive conductor of the main supply circuit 3, by the branch 9', the resistance 14', contacts 19', 19", the conductors 17, the primary coil of the transformer 12, the wire 15, the interrupter 5, the brush 16 at the interrupter, and the wire of the branch circuit 3' connected with the main negative supply main, and by this back to the generator. It will be observed that when the magnetic switch 10 is closed the two contacts 19, 19' constituting the terminals of the branch conductors 9, 9' are united at the switch 10. But as the resistance offered to the flow of current by each resistance 14 is considerably greater than the resistance of the primary coil of the transformer 12, the current takes the path traced, instead of passing through both resistances 14, 14'. Returning to the circuit followed by the current it will be next supposed that the interrupter, moving in the direction indicated by the arrow, has turned so as to bring one of its arms into engagement with the brush 16' constituting the terminal of the positive wire of the branch 3'. The circuit then is from the positive wire of the supply line, by the positive wire of the branch 3', brush 16' at the end thereof, the interrupter, the conductor 15, the primary of the transformer, the conductor 17, the terminal contact 19'' at the end thereof, the movable contact of the automatic magnetic switch, the terminal contact 19, resistance 14, and branch wire 9, to the negative wire of the supply circuit. It will thus be seen that while a direct current is supplied to the apparatus from the line 3, this current is interrupted with great frequency, and its direction through the primary coil of the transformer is changed at each interruption, thus producing an alternating current, but one of quite a different nature from the ordinary alternating electric current in that the alternations are separated by periods of no flow of current of a length of duration approximately the periods of current flow. The result is that there is induced in the secondary coil of the transformer and the circuit of which it is a part, a series of currents of high potential, very short duration, and of successively alternate direction separated by periods of rest or no flow of current.

As represented in Fig. 1, as also in Figs. 2, 5 and 6, the conductors of the alternate fly sticks $a'$ are connected respectively with the wires leading from the opposite ends of the secondary coil of the transformer. The current induced in this secondary circuit is of such high potential as to produce an interrupted, alternating, electro-static field of an area somewhat larger than the area of the fly, into which field the sheet of paper enters on being delivered upon the fly. The conductors 22 of the fly are preferably bare wires laid upon the sticks so as to be directly engaged by the sheets of paper delivered to the fly and are in any suitable manner secured to the fly sticks, several arrangements of the conductors being indicated in Figs. 4, 5 and 6, so that when the sheets of paper are received upon the fly they come into direct engagement with the said conductors. If a sheet of paper charged with static electricity be laid upon the fly of a press equipped with my present invention as described, its charge of electricity is removed, dissipated, or lost rapidly by its being subjected to the electric influences incident to the circuit 13 being charged in the manner I have described. I have discovered, however, that the removal of the static electricity is more complete and perfect if the interrupted alternating electro-static fields, in which the sheet of paper is situated while upon the fly, be gradually reduced in intensity until it is substantially suppressed before the sheet is removed, that is, while it is at rest relative to the conductors of the fly.

This suppression of the electric conditions to which the paper is subjected while upon the fly is conveniently accomplished by breaking the connections of the fly conductors with the circuit 13. Means for accomplishing this are illustrated in Fig. 4. 20 indicates stationary contacts constituting the terminals of the circuit 13. With these engage the movable contacts 21 mounted upon and carried by the shaft $a$ and which are connected respectively with the conductors 22 carried by the fly sticks $a'$. The location of the contacts 21 is such that they make electrical connection with the contacts 20 when the fly is in position to receive sheets of paper or immediately after it has begun its movement from such position, and maintain such connection for a desired length of time, that is, until the fly has been moved a certain proportion of its path of motion. Before the fly reaches a position to deliver the sheet the contacts 20, 21 separate entirely, thus introducing into the high tension current circuit a resistance produced by an air gap between the contacts 20 and 21 which, as it increases in length operates to gradually suppress the aforesaid electrostatic field. Just before the fly reaches the delivery position the contacts 21 may come into engagement with contacts 23 constituting the terminals of a conductor or conductors 24 that are grounded. Thus when the sheet of paper is received upon the fly it is first subjected to the electric conditions incident to the conductors 22 being highly charged, and while still supported upon the fly these conditions are first suppressed and thereafter the conductors 21 are connected with the earth so that any electricity remaining in the paper is carried off thereby.

The method of mounting and supporting the conductors 22 upon the fly sticks may be varied as indicated in Figs. 5 and 6.

What I claim is:—

1. The herein described method of removing static electricity from a charged dielectric, which consists in bringing the said charged body into an electro-static field surrounding conductors charged with electricity of high alternating potential, and then gradually suppressing said electro-static field before the said dielectric is removed from proximity to the conductors.

2. The herein described method of removing static electricity from a charged dielectric, which consists in bringing the said charged body into an electro-static field surrounding conductors charged with electricity of high potential of an alternating character but having periods between alternations when the conductors are not charged, and then gradually reducing the intensity of the said field until it is substantially suppressed before the said dielectric is removed from proximity to the conductors.

3. The herein described method of removing static electricity from a charged dielectric, which consists in bringing the said dielectric into engagement with conductors charged with electricity of high alternating potential, and then gradually suppressing the said high tension electric charge of the conductors before the dielectric is removed from contact therewith.

4. The herein described method of removing static electricity from a charged dielectric, which consists in bringing the dielectric into the electro-static field surrounding a series of parallel conductors charged with electricity of high alternating potential, the charge being interrupted with great frequency, and then gradually suppressing the said electro-static field, and then removing the said dielectric from proximity to the said conductors while the said field is suppressed.

5. The herein described method of treatment for removing static electricity from a charged dielectric, which consists in bringing the dielectric into an electro-static field surrounding a series of parallel conductors charged with electricity of high alternating potential, interrupting the charge with great frequency, reversing the direction of movement of the current in the conductors with each interruption and gradually suppressing the charge before the dielectric is removed.

6. The herein described method of removing static electricity from a charged dielectric, which consists in bringing the dielectric into an electro-static field surrounding a set of parallel conductors charged with electricity of high potential, the charge being interrupted with great frequency, and the direction of the movement of the current in the conductors being reversed with each interruption, and then gradually suppressing the said electro-static field before the said dielectric is removed from proximity to the said conductors.

7. Apparatus for removing static electricity from a charged dielectric comprising a support for the dielectric, conductors arranged adjacent to the support, means for charging the conductors with electricity of high alternating potential, and means for gradually suppressing the charge of electricity in the conductors while the dielectric is on the said support.

8. Apparatus for removing static electricity from a charged dielectric comprising a support for the dielectric, the support being formed of a series of longitudinal parallel conductors, means for charging the conductors with electricity of high potential and interrupted alternations, and means for gradually suppressing the charge of high tension electricity in the conductors from full intensity to substantially the null point while the dielectric is on the said support.

9. Apparatus for removing static electricity from a charged dielectric, comprising a support for the dielectric formed of a series of longitudinally parallel conductors, the superficial area of which is at least equal to that of the dielectric to be treated, means for producing an electro-static field about the said support, comprising means for charging the conductors with electricity of high tension, the flow of which is rapidly interrupted and the direction of which is changed with each interruption, and means for gradually suppressing the said electrostatic field while the dielectric is upon the support.

ANATOLE C. HEINY.

Witnesses:
J. S. BARKER,
GEO. B. PITTS.